US010141969B2

(12) United States Patent
Adjesson

(10) Patent No.: US 10,141,969 B2
(45) Date of Patent: Nov. 27, 2018

(54) MOBILE ELECTRONIC DEVICE PROTECTION CASE

(71) Applicant: Eric Adjesson, Alpharetta, GA (US)

(72) Inventor: Eric Adjesson, Alpharetta, GA (US)

(*) Notice: Subject to any disclaimer, the term of this patent is extended or adjusted under 35 U.S.C. 154(b) by 0 days.

(21) Appl. No.: 15/470,378

(22) Filed: Mar. 27, 2017

(65) Prior Publication Data
US 2017/0279477 A1 Sep. 28, 2017

Related U.S. Application Data

(60) Provisional application No. 62/313,221, filed on Mar. 25, 2016.

(51) Int. Cl.
H04M 1/00 (2006.01)
H04B 1/3888 (2015.01)
H04M 1/18 (2006.01)

(52) U.S. Cl.
CPC .......... H04B 1/3888 (2013.01); H04M 1/185 (2013.01)

(58) Field of Classification Search
CPC ............... H04B 5/0037; H04B 1/3888; H04B 2001/3861; H04B 7/18506; H01M 2220/30; H01M 2/1061

USPC ...................................................... 455/575.8
See application file for complete search history.

(56) References Cited

U.S. PATENT DOCUMENTS

| 8,490,783 | B1* | 7/2013 | Fan | H04M 1/185 206/45.23 |
| 2010/0096284 | A1* | 4/2010 | Bau | H04B 1/3888 206/320 |
| 2013/0042581 | A1* | 2/2013 | Holben | H04B 1/3888 53/473 |

* cited by examiner

Primary Examiner — Ajibola Akinyemi

(57) ABSTRACT

A mobile electronic device protection case provides protection to mobile electronic devices. Mobile electronic devices include, but are not limited to, cellphones, tablets, or similar electronic devices. The mobile electronic device protection case is easily attachable and detachable from the mobile electronic device. While protecting the mobile electronic device, the present invention leaves a majority of the mobile electronic device exposed in order to highlight the aesthetic of the mobile electronic device. The mobile electronic device protection case includes a plurality of corner protectors to engage the corners for the mobile electronic device to protect the mobile electronic device from lateral impacts to the corners. Each corner protector of the plurality of corner protectors include a first clip support and a second clip support to secure the corner protector to either side of the mobile electronic device.

17 Claims, 9 Drawing Sheets

MOBILE ELECTRONIC DEVICE PROTECTION CASE

The current application claims a priority to the U.S. Provisional Patent application Ser. No. 62/313,221 filed on Mar. 25, 2016.

FIELD OF THE INVENTION

The present invention relates generally to electronic device casing. More specifically, the present invention is a mobile electronic device protection case apparatus to protect the corners of an electronic device from impacts of being dropped.

BACKGROUND OF THE INVENTION

Since the invention of the first cellular phone by Martin Cooper in 1973, mobile communication devices have improved significantly. From text messaging to software applications capable of assisting with health concerns, productivity, and entertainment, cellphones are an integral part of daily life.

While cellphone functionalities continue to take leaps, manufactures are also busy with design and aesthetics. In such a competitive market, manufactures can use all the advantage they can get and often success boils down to the allure of the device to attract buyers. From aluminum frames to more luxurious finishes, a substantial research and development budget is allocated to the design and presentation of cellphones.

As attractive as cellphones are, cellphones happen to also be very expensive and tend to be fragile. Therefore, consumers have very little choices but to seek extra protection, and the first thing generally purchased is a protective. The protective case, however, tends to cover the aesthetic of the cellphone.

In the competitive protective case market, there have not been many successful attempts with the design of cell phone cases that gives a balance between protecting and presenting the intended aesthetic of the device. There are segments of the industry that are, however, well covered. The rugged construction and outdoors environment for example is well covered by Otter and other companies.

One demographic that has been neglected is people who love the look of their devices and would rather take on an increased risk of damage. This consumer demographic would rather not have a protective case on their phones if a bulky case is the only choice available.

The present invention offers a new way for the consumer who likes the aesthetic and feel of a bare cellphone to also have the protection to some extent of protective case. The protective case will also be useful to those who are all about their image inherently or earned. Executives and sales reps for example, with these positions, appearance holds an awful lot of values. For these individuals, a clean and impressive look is essential.

DETAIL DESCRIPTIONS OF THE INVENTION

All illustrations of the drawings are for the purpose of describing selected versions of the present invention and are not intended to limit the scope of the present invention.

The present invention is a mobile electronic device protection case. Mobile electronic devices include, but are not limited to, cellphones, tablets, or similar electronic devices. The present invention provides protection to such mobile electronic devices. The present invention is easily attachable and detachable from the mobile electronic device. While protecting the mobile electronic device, the present invention leaves a majority of the mobile electronic device exposed in order to highlight the aesthetic of the mobile electronic device.

Figure 1:
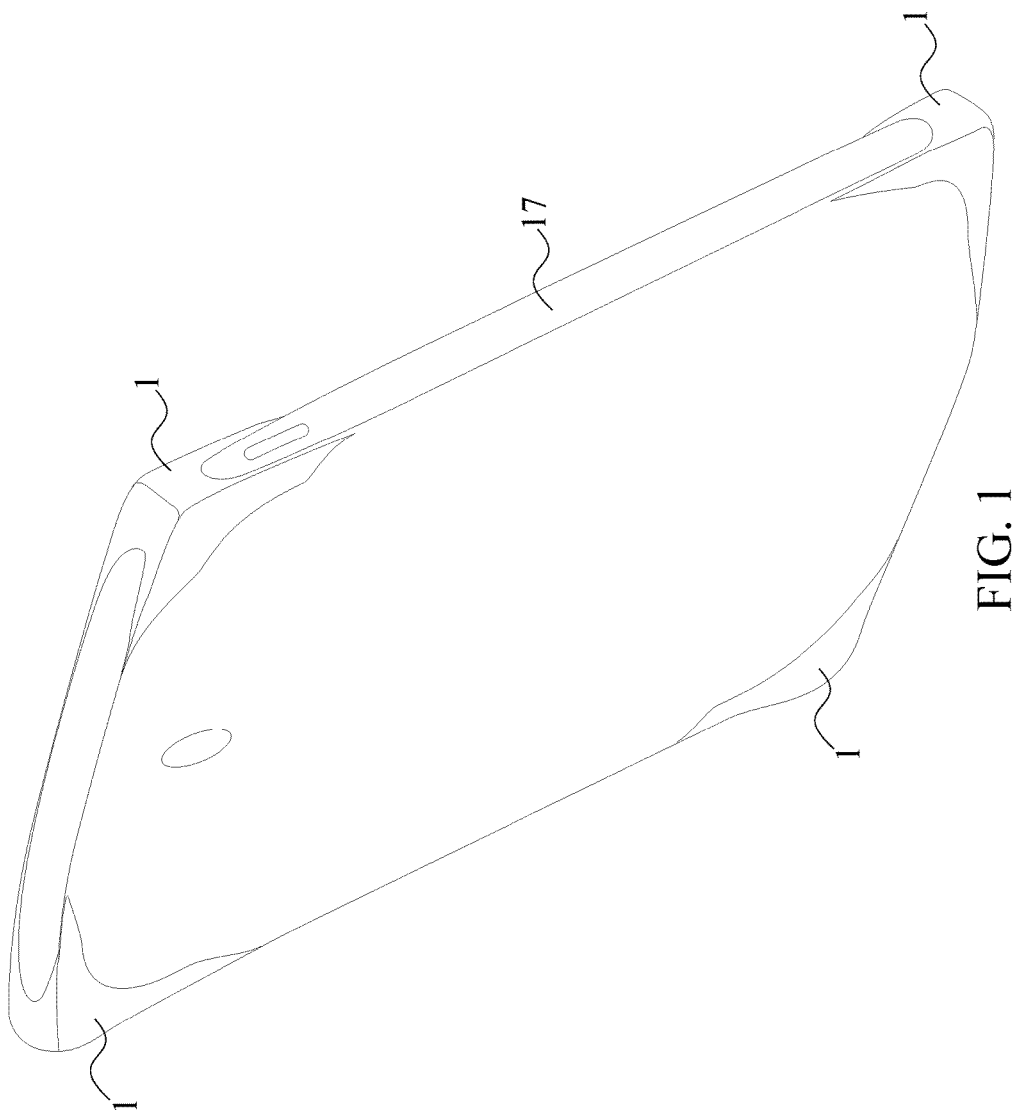
FIG. 1 is perspective view for the simplest embodiment of the present invention, wherein a plurality of corner protectors of the present invention engages a mobile electronic device.
Figure 2:
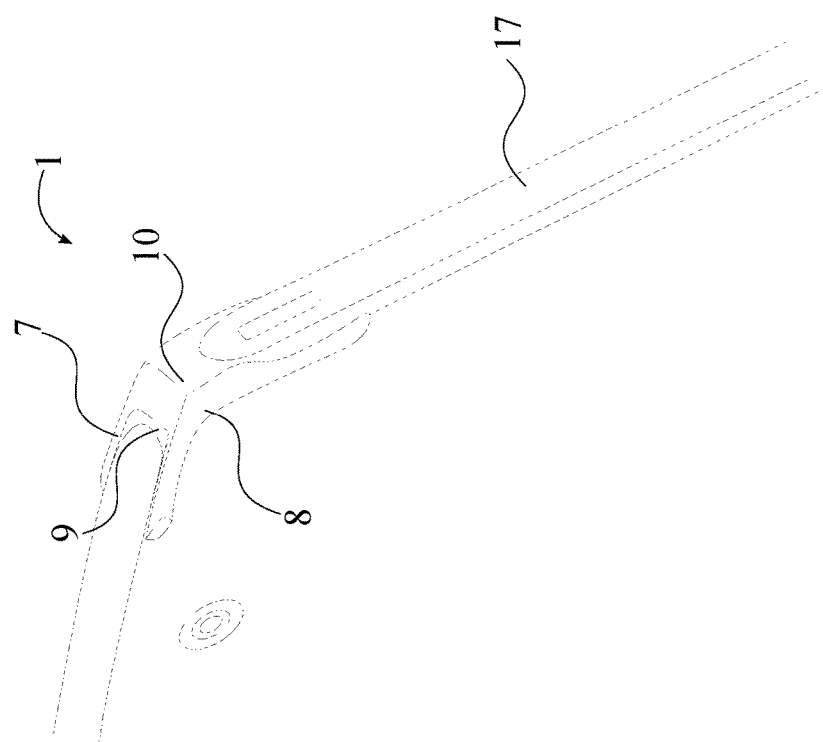
FIG. 2 is a detailed view for a corner protector of the plurality of corner protectors engaging a corner of the mobile electronic device.

In accordance to FIG. 1, the present invention comprises a plurality of corner protectors 1. The plurality of corner protectors 1 each engage a corner for a mobile electronic device 17, in order to absorb impacts to the corners of the mobile electronic device 17. Each of the plurality of corner protectors 1 comprises a first clip support 7, a second clip support 8, a lateral support 9 and a protective coating 10, as detailed in FIG. 2. The first clip support 7 presses against a front the mobile electronic device 17 and the second clip support 8 presses against a back of the mobile electronic device 17 to secure the present invention to the mobile electronic device 17. The lateral support 9 is positioned about a corner of the mobile electronic device 17 to protect the mobile electronic device 17 from lateral impacts. The protective coating 10 provides additional dampening of impacts to protect the mobile electronic device 17.

Figure 3:
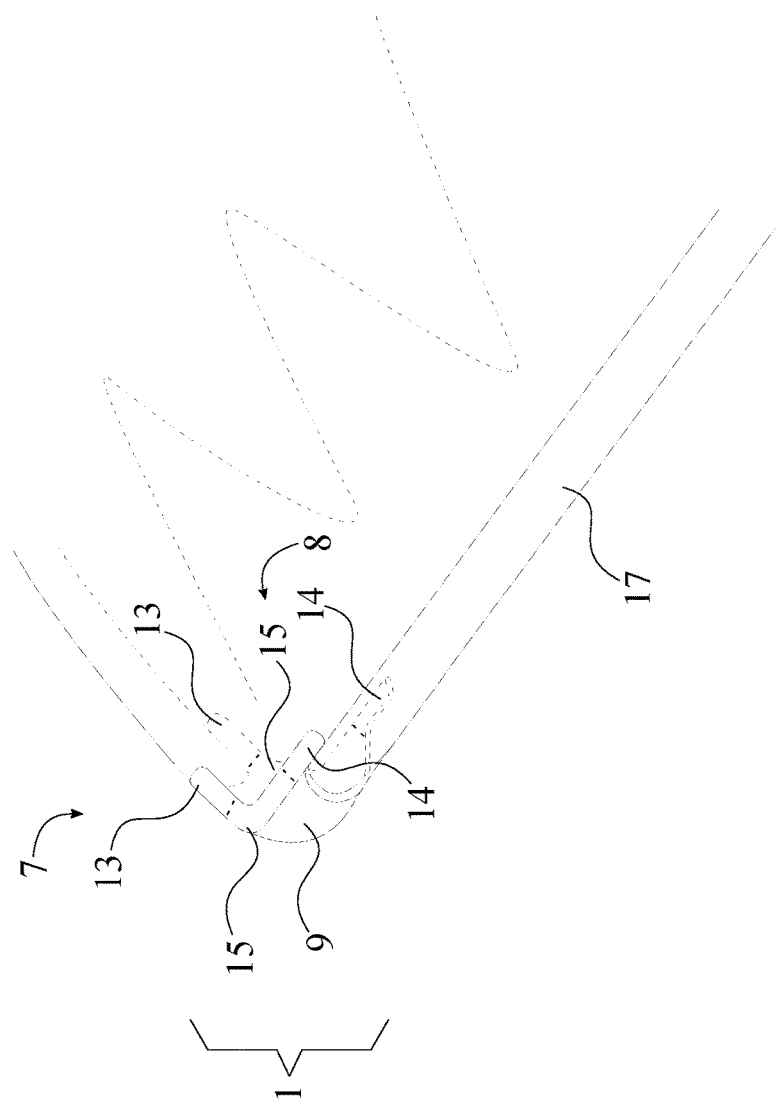
FIG. 3 is a perspective view further detailing the corner protector.

The first clip support 7 and the second clip support 8 each comprise a first securing arm 13, a second securing arm 14 and a clip base 15, detailed in FIG. 3. The first securing arm 13 and the second securing arm 14 provide stability for the first clip support 7 and the second clip support 8 along edges of the mobile electronic device 17. The first securing arm 13 is adjacently connected to the clip base 15. Similarly, the second securing arm 14 is adjacently connected to the clip base 15. The first securing arm 13 is oppositely positioned to the second securing arm 14 along the clip base 15. Thus, allowing the first securing arm 13 and the second securing arm 14 to be positioned against adjacent edges of the mobile electronic device 17 and the clip base 15 against the vertex of the adjacent edges. As most mobile electronic devices have a generally rectangular geometry, the first securing arm 13 is preferred to be perpendicularly oriented with the second securing arm 14. The clip base 15 of the first clip support 7 is adjacently connected to the lateral support 9. Similarly, the clip base 15 of the second clip support 8 is adjacently connected to the lateral support 9, the clip base 15 of the first clip support 7 is oppositely positioned to the clip base 15 of the second clip support 8 about the lateral support 9 such that the first clip support 7 and the second clip support 8 can engage opposite sides of the mobile electronic device 17.

The protective coating 10 provides additional dampening of impacts to protect the mobile electronic device 17. The protective coating 10 is preferred to be made from silicon, rubber, or thermoplastic to provide elasticity and sufficient impact dampening properties. The protective coating 10 is superimposed on the first clip support 7, the second clip support 8 and the lateral support 9, in accordance to FIG. 2 and FIG. 8.

Figure 4:
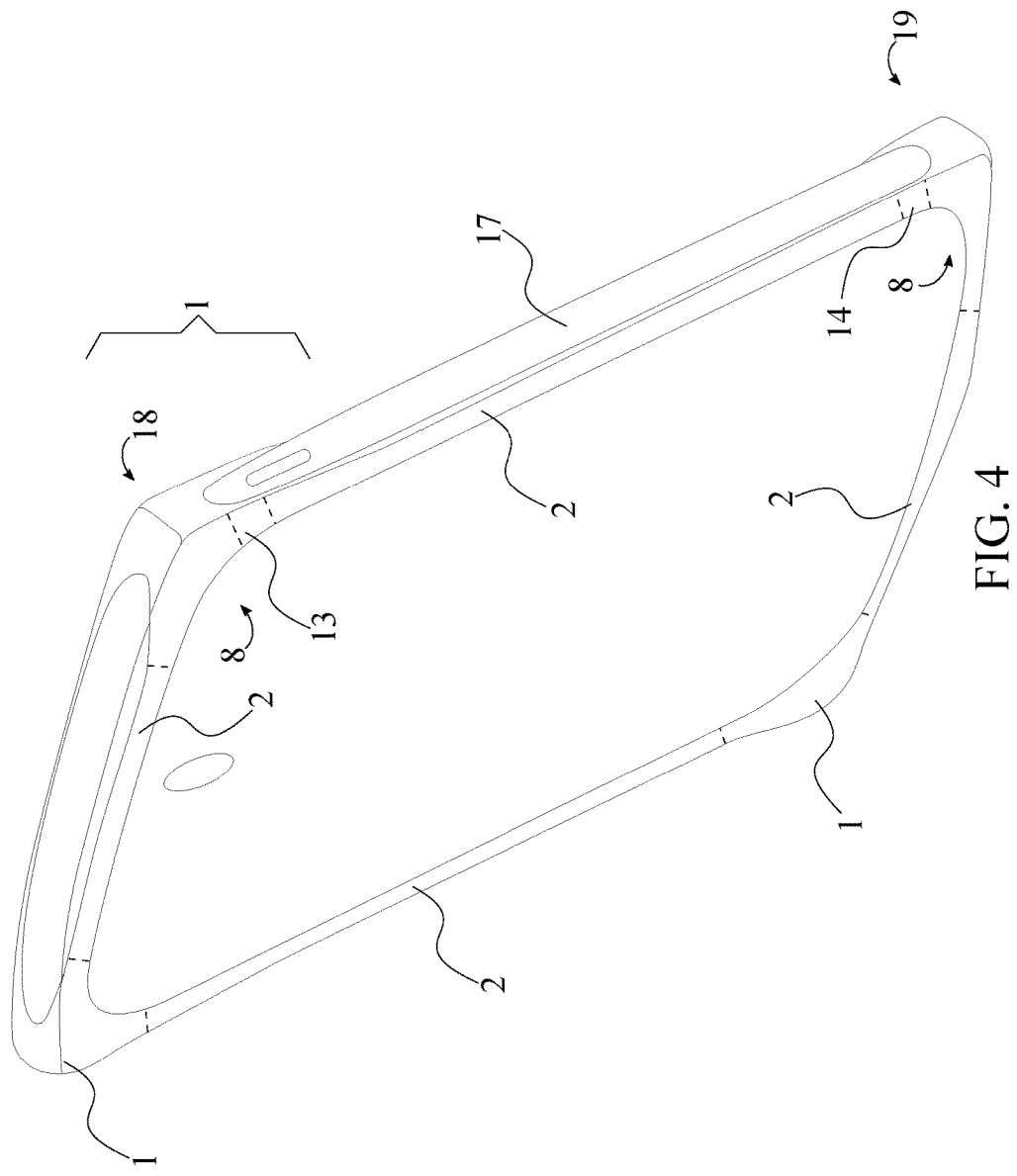
FIG. 4 is a rear perspective view for an alternate embodiment of the present invention, wherein each corner protector is connected to another corner protector through a support strut of the plurality of support struts.
Figure 5:
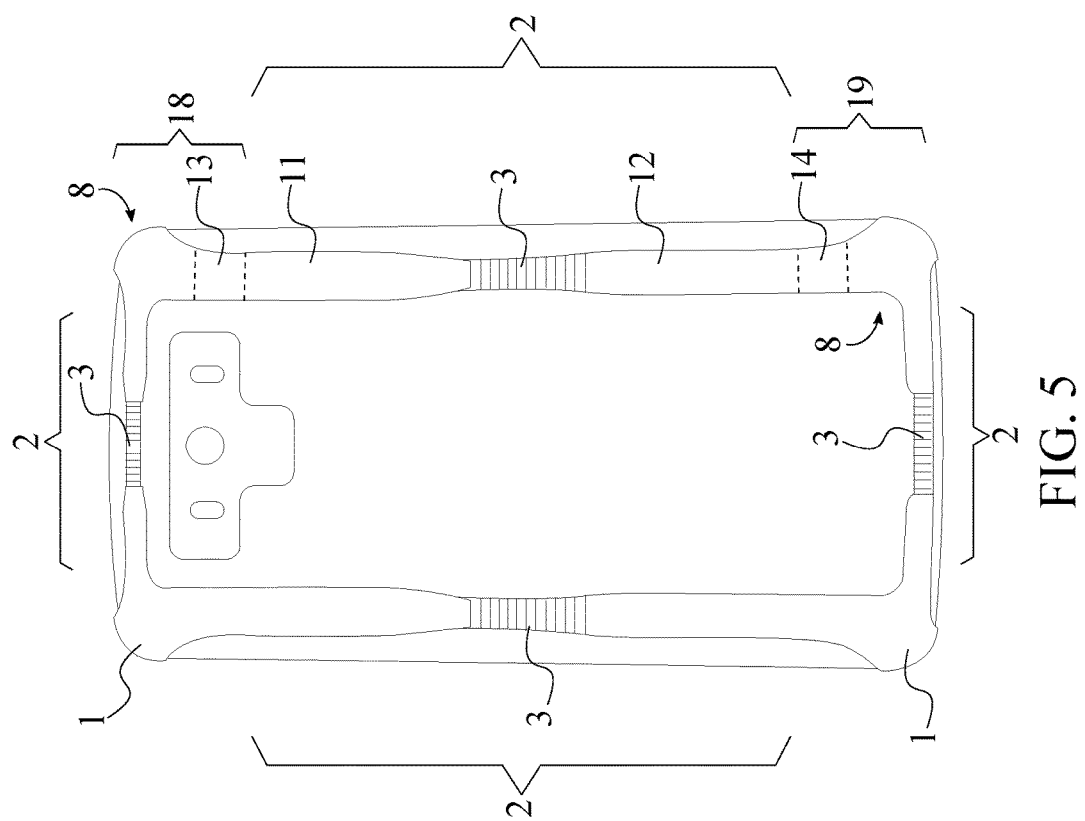
FIG. 5 is a rear view for an alternate embodiment of the present invention, wherein an elastic strut tie is integrated into each of the support struts.

In accordance to an alternate embodiment of the present invention, the present invention comprises a plurality of supporting struts 2, exemplified in FIG. 4 and FIG. 5. The plurality of supporting struts 2 provide tension between each of the plurality of corner protectors 1, and the plurality of supporting struts 2 provide minor protection to the rear of the electronic mobile device 17. Each of the plurality of corner protectors 1 is connected to another corner protector of the plurality of corner protectors 1 through a supporting strut to provide the tension between each of the plurality of corner protectors 1. More specifically, a corresponding supporting strut of the plurality of supporting struts 2 is connected the first securing arm 13 of the second clip support 8 for a first corner protector 18 of the plurality of corner protectors 1 and to the second securing arm 14 of the second clip support 8 for a second corner protector 19 of the plurality of corner protectors 1. This configuration allows for the screen of the mobile electronic device 17 to remain unobstructed while providing additional protection to the back of the mobile electronic device 17.

In a more specific alternate embodiment of the present invention, the present invention comprises a plurality of elastic strut ties 3, in accordance to FIG. 5. The plurality of elastic strut ties 3 introduces additional elasticity to each of the plurality of supporting struts 2, allowing the present invention to conform to a plurality of mobile electronic devices having different dimensions. Each supporting strut comprises a first strut portion 11 and a second strut portion 12. The first strut portion 11 is connected to the second strut portion 12 though an elastic strut tie of the plurality of elastic strut ties 3. The first strut portion 11 of a corresponding supporting strut is connected to the first securing arm 13 of the second clip support 8 for the first corner protector 18 of the plurality of corner protectors 1. Similarly, the second strut portion 12 of the corresponding supporting strut is connected to the second securing arm 14 of the second clip support 8 for the second corner protector 19 of the plurality of corner protectors 1. This configuration allows the plurality of corner protectors 1 to expand out from each other to fit different dimensions for a plurality of mobile electronic devices.

Figure 6:
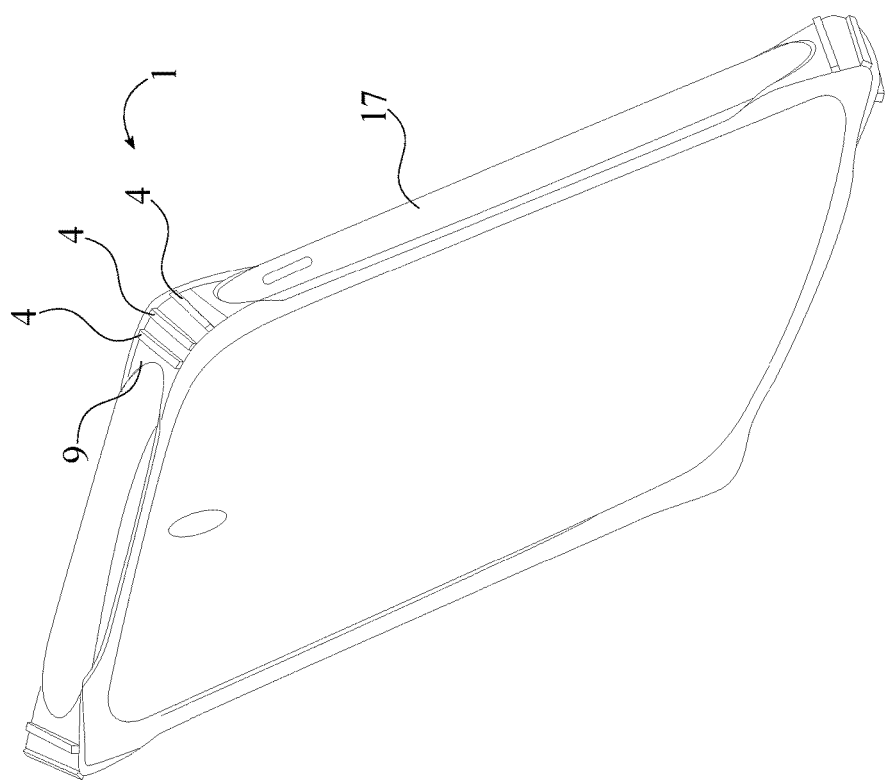
FIG. 6 is a perspective view for an alternate embodiment of the present invention, wherein a plurality of impact-dampening extrusions is connected onto a lateral support of the corner protector.

In another embodiment of the present invention, each of the plurality of corner protectors 1 further comprises a plurality of impact-dampening extrusions 4, shown in FIG. 6. The plurality of impact-dampening extrusions 4 further dampens lateral impacts onto the plurality of corner protectors 1. each of the plurality of impact-dampening extrusions 4 is adjacently connected to the lateral support 9. Each of the plurality of impact-dampening extrusions 4 is oriented parallel to each other. Thus, allowing the plurality of impact-dampening extrusions 4 to deform from a lateral impact onto the mobile electronic device 17 instead of damaging the mobile electronic device 17.

Figure 7:
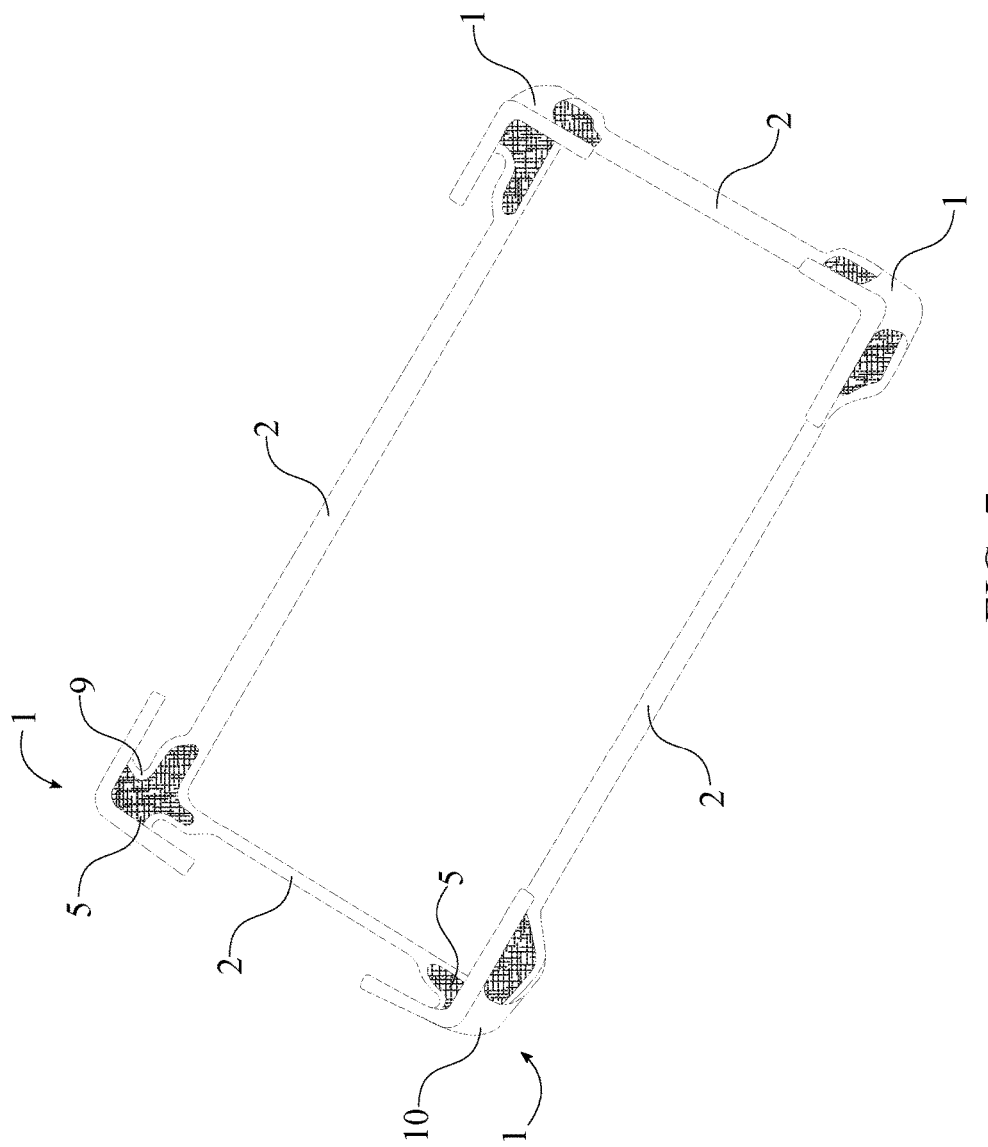
FIG. 7 is a front perspective view of the present invention, wherein a viscoelastic foam is superimposed onto the lateral support.

Similarly, some other embodiments of the present invention comprise a viscoelastic foam 5, commonly referred to as memory foam, to cushion the mobile electronic device 17 from damage. In accordance to FIG. 7, the viscoelastic foam 5 is superimposed onto the lateral support 9. The viscoelastic foam 5 is positioned opposite to the protective coating 10 about the lateral support 9, such that the viscoelastic foam 5 directly interfaces with the mobile electronic device 17. The viscoelastic foam 5 assists in protecting the mobile electronic device 17 from lateral impacts.

Figure 8:
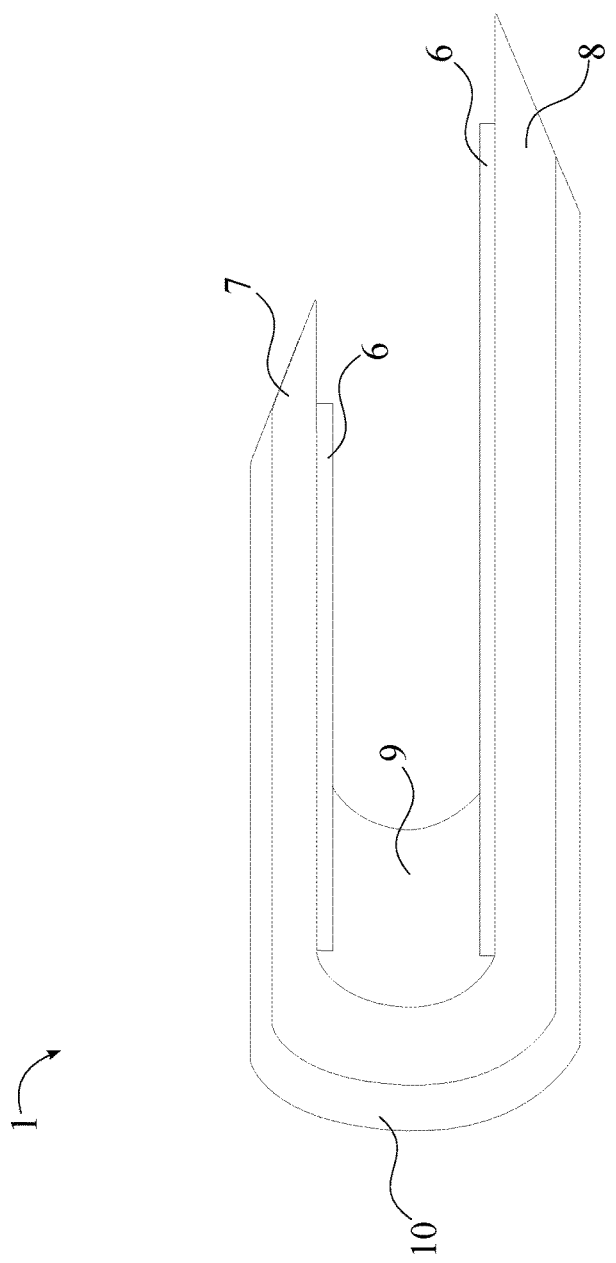
FIG. 8 is a side view of the corner protector, wherein a semi-adhesive layer is super imposed onto the first clip support and the second clip support.

In accordance to another embodiment of the present invention, the present invention comprises a semi-adhesive layer 6, shown in FIG. 8. The semi adhesive layer secures each of the plurality of corner protectors 1 to the mobile electronic device 17, while allowing the plurality of corner protectors 1 to be removed from the mobile electronic device 17 easily. The semi-adhesive layer 6 is superimposed onto the first clip support 7. The semi-adhesive layer 6 is oppositely positioned to the protective coating 10 about the first clip support 7, in order to interface with the mobile electronic device 17. The semi-adhesive layer 6 is superimposed onto the second clip support 8. The semi-adhesive layer 6 is oppositely positioned to the protective coating 10 about the second clip support 8, in order to interface with the mobile electronic device 17. Therefore, with this configuration, the semi-adhesive layer 6 secures each of the plurality of corner protectors 1 to the front and the rear of the mobile electronic device 17.

Figure 9:
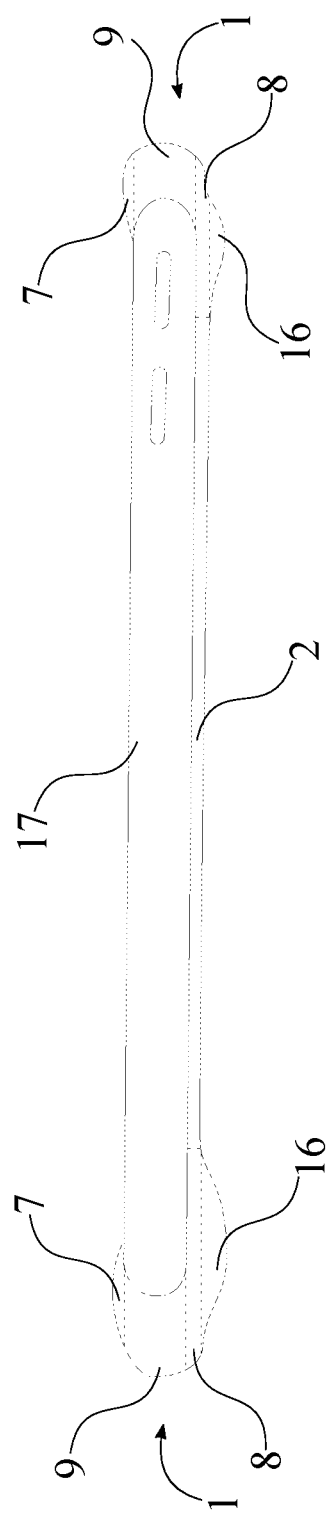
FIG. 9 is a side view for an alternate embodiment of the present invention wherein an elevating extrusion is connected a clip base of the second clip support.

In some other embodiments of the present invention, each second clip support 8 comprises an elevating extrusion 16, in accordance to FIG. 9. The elevating extrusion 16 offsets the mobile electronic device 17 from a resting surface. The elevating extrusion 16 is adjacently connected to the clip base 15. The elevating extrusion 16 is oppositely positioned to the lateral support 9. This configuration allows the user to easily pick up the mobile electronic device 17 while providing additional protection to the rear of the mobile electronic device 17.

Although the invention has been explained in relation to its preferred embodiment, it is to be understood that many other possible modifications and variations can be made without departing from the spirit and scope of the invention as hereinafter claimed.

What is claimed is:
1. A mobile electronic device protection case comprising:
a plurality of corner protectors;
each of the plurality of corner protectors comprising a first clip support, a second clip support, a lateral support, and a protective coating;
the first clip support and the second clip support each comprise a first securing arm, a second securing arm and a clip base;
the first securing arm being adjacently connected to the clip base;
the second securing arm being adjacently connected to the clip base;
the first securing arm being oppositely positioned to the second securing arm along the clip base;
the clip base of the first clip support being adjacently connected to the lateral support;

the clip base of the second clip support being adjacently connected to the lateral support;
the clip base of the first clip support being oppositely positioned to the clip base of the second clip support about the lateral support;
the protective coating being superimposed on the first clip support, the second clip support, and the lateral support;
a plurality of supporting struts;
each of the plurality of corner protectors being connected to another corner protector of the plurality of corner protectors through a supporting strut of the plurality of supporting struts;
a plurality of elastic strut ties;
each supporting strut of the plurality of supporting struts comprising a first strut portion and a second strut portion; and
the first strut portion being connected to the second strut portion through an elastic strut tie of the plurality of elastic strut ties.

2. The mobile electronic device protection case, as claimed in claim 1, comprising:
the first securing arm being perpendicularly oriented with the second securing arm.

3. The mobile electronic device protection case, as claimed in claim 1, comprising:
a corresponding supporting strut of the plurality of supporting struts being connected to the first securing arm of the second clip support for a first corner protector of the plurality of corner protectors and to the second securing arm of the second clip support for a second corner protector of the plurality of corner protectors.

4. The mobile electronic device protection case, as claimed in claim 1, comprising:
the first strut portion of a corresponding supporting strut being connected to the first securing arm of the second clip support for a first corner protector of the plurality of corner protectors; and
the second strut portion of the corresponding supporting strut being connected to the second securing arm of the second clip support for a second corner protector of the plurality of corner protectors.

5. The mobile electronic device protection case, as claimed in claim 1, comprising:
each of the plurality of corner protectors comprising a plurality of impact-dampening extrusions;
each of the plurality of impact-dampening extrusions being adjacently connected to the lateral support; and
each of the plurality of impact-dampening extrusions being oriented parallel to each other.

6. The mobile electronic device protection case, as claimed in claim 1, comprising:
a viscoelastic foam;
the viscoelastic foam being superimposed onto the lateral support; and
the viscoelastic foam being positioned opposite to the protective coating about the lateral support.

7. The mobile electronic device protection case, as claimed in claim 1, comprising:
a semi-adhesive layer;
the semi-adhesive layer being superimposed onto the first clip support; and
the semi-adhesive layer being oppositely positioned to the protective coating about the first clip support.

8. The mobile electronic device protection case, as claimed in claim 1, comprising:
a semi-adhesive layer;
the semi-adhesive layer being superimposed onto the second clip support; and
the semi-adhesive layer being oppositely positioned to the protective coating about the second clip support.

9. The mobile electronic device protection case, as claimed in claim 1, comprising:
each second clip support comprising an elevating extrusion;
the elevating extrusion being adjacently connected to the clip base; and
the elevating extrusion being oppositely positioned to the lateral support.

10. A mobile electronic device protection case comprising:
a plurality of corner protectors;
a plurality of supporting struts;
each of the plurality of corner protectors comprising a first clip support, a second clip support, a lateral support, and a protective coating;
the first clip support and the second clip support each comprise a first securing arm, a second securing arm and a clip base;
the first securing arm being adjacently connected to the clip base;
the second securing arm being adjacently connected to the clip base;
the first securing arm being oppositely positioned to the second securing arm along the clip base;
the clip base of the first clip support being adjacently connected to the lateral support;
the clip base of the second clip support being adjacently connected to the lateral support;
the clip base of the first clip support being oppositely positioned to the clip base of the second clip support about the lateral support;
the protective coating being superimposed on the first clip support, the second clip support, and the lateral support;
each of the plurality of corner protectors being connected to another corner protector of the plurality of corner protectors through a supporting strut of the plurality of supporting struts;
a plurality of elastic strut ties;
each supporting strut of the plurality of supporting struts comprising a first strut portion and a second strut portion; and
the first strut portion being connected to the second strut portion through an elastic strut tie of the plurality of elastic strut ties.

11. The mobile electronic device protection case, as claimed in claim 10, comprising:
a corresponding supporting strut of the plurality of supporting struts being connected to the first securing arm of the second clip support for a first corner protector of the plurality of corner protectors and to the second securing arm of the second clip support for a second corner protector of the plurality of corner protectors.

12. The mobile electronic device protection case, as claimed in claim 10, comprising:
the first strut portion of a corresponding supporting strut being connected to the first securing arm of the second clip support for a first corner protector of the plurality of corner protectors; and
the second strut portion of the corresponding supporting strut being connected to the second securing arm of the second clip support for a second corner protector of the plurality of corner protectors.

13. The mobile electronic device protection case, as claimed in claim 10, comprising:
- each of the plurality of corner protectors comprising a plurality of impact-dampening extrusions;
- each of the plurality of impact-dampening extrusions being adjacently connected to the lateral support; and
- each of the plurality of impact-dampening extrusions being oriented parallel to each other.

14. The mobile electronic device protection case, as claimed in claim 10, comprising:
- a viscoelastic foam;
- the viscoelastic foam being superimposed onto the lateral support; and
- the viscoelastic foam being positioned opposite to the protective coating about the lateral support.

15. The mobile electronic device protection case, as claimed in claim 10, comprising:
- a semi-adhesive layer;
- the semi-adhesive layer being superimposed onto the first clip support; and
- the semi-adhesive layer being oppositely positioned to the protective coating about the first clip support.

16. The mobile electronic device protection case, as claimed in claim 10, comprising:
- a semi-adhesive layer;
- the semi-adhesive layer being superimposed onto the second clip support; and
- the semi-adhesive layer being oppositely positioned to the protective coating about the second clip support.

17. The mobile electronic device protection case, as claimed in claim 10, comprising:
- each second clip support comprising an elevating extrusion;
- the elevating extrusion being adjacently connected to the clip base; and
- the elevating extrusion being oppositely positioned to the lateral support.

* * * * *